(12) United States Patent
Molgaard

(10) Patent No.: US 9,596,423 B1
(45) Date of Patent: Mar. 14, 2017

(54) CHARGE SUMMING IN AN IMAGE SENSOR

(71) Applicant: Apple Inc., Cupertino, CA (US)

(72) Inventor: Claus Molgaard, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/503,322

(22) Filed: Sep. 30, 2014

Related U.S. Application Data

(60) Provisional application No. 61/907,375, filed on Nov. 21, 2013.

(51) Int. Cl.
*H04N 5/372* (2011.01)

(52) U.S. Cl.
CPC .............................. *H04N 5/37213* (2013.01)

(58) Field of Classification Search
CPC .................................................. H04N 5/37213
USPC ......................................................... 348/308
See application file for complete search history.

(56) References Cited

U.S. PATENT DOCUMENTS

| | | | |
|---|---|---|---|
| 4,686,572 A | 8/1987 | Takatsu | |
| 4,686,648 A | 8/1987 | Fossum | |
| 5,105,264 A | 4/1992 | Erhardt | |
| 5,329,313 A | 7/1994 | Keith | |
| 5,396,893 A | 3/1995 | Oberg et al. | |
| 5,471,515 A | 11/1995 | Fossum et al. | |
| 5,541,402 A | 7/1996 | Ackland | |
| 5,550,677 A | 8/1996 | Schofield et al. | |
| 5,781,312 A | 7/1998 | Noda | |
| 5,841,126 A | 11/1998 | Fossum et al. | |
| 5,880,459 A | 3/1999 | Pryor et al. | |
| 5,949,483 A | 9/1999 | Fossum et al. | |
| 6,008,486 A | 12/1999 | Stam et al. | |
| 6,040,568 A | 3/2000 | Caulfield et al. | |
| 6,233,013 B1 | 5/2001 | Hosier et al. | |
| 6,348,929 B1 | 2/2002 | Acharya et al. | |
| 6,448,550 B1 | 9/2002 | Nishimura | |
| 6,528,833 B2 | 3/2003 | Lee et al. | |
| 6,541,751 B1 | 4/2003 | Bidermann | |
| 6,713,796 B1 | 3/2004 | Fox | |
| 6,714,239 B2 | 3/2004 | Guidash | |
| 6,798,453 B1 | 9/2004 | Kaifu | |
| 6,816,676 B2 | 11/2004 | Bianchi et al. | |

(Continued)

FOREIGN PATENT DOCUMENTS

| | | |
|---|---|---|
| CN | 1842138 | 10/2006 |
| CN | 101189885 | 5/2008 |

(Continued)

OTHER PUBLICATIONS

Aoki, et al., "Rolling-Shutter Distortion-Free 3D Stacked Image Sensor with—160dB Parasitic Light Sensitivity In-Pixel Storage Node," ISSCC 2013, Session 27, Image Sensors, 27.3 27.3 A, Feb. 20, 2013, retrieved on Apr. 11, 2014 from URL:http://ieeexplore.ieee.org/stamp/stamp.jsp?tp=&arnumber=6487824.

(Continued)

*Primary Examiner* — Gevell Selby
(74) *Attorney, Agent, or Firm* — Brownstein Hyatt Farber Schreck, LLP

(57) ABSTRACT

An image sensor includes a pixel array having a plurality of pixels. Pixels can be summed or binned diagonally in the pixel array in a first diagonal direction and in a different second diagonal direction. The locations of the first and second diagonal summed pairs can be distributed across the pixel array.

21 Claims, 10 Drawing Sheets

(56) References Cited

U.S. PATENT DOCUMENTS

| | | |
|---|---|---|
| 6,905,470 B2 | 6/2005 | Lee et al. |
| 6,931,269 B2 | 8/2005 | Terry |
| 6,956,605 B1 | 10/2005 | Hashimoto |
| 6,982,759 B2 | 1/2006 | Goto |
| 7,091,466 B2 | 8/2006 | Bock |
| 7,119,322 B2 | 10/2006 | Hong |
| 7,133,073 B1 * | 11/2006 | Neter ............ H04N 5/3454 348/222.1 |
| 7,259,413 B2 | 8/2007 | Rhodes |
| 7,262,401 B2 | 8/2007 | Hopper et al. |
| 7,271,835 B2 | 9/2007 | Iizuka |
| 7,282,028 B2 | 10/2007 | Kim et al. |
| 7,332,786 B2 | 2/2008 | Altice |
| 7,390,687 B2 | 6/2008 | Boettiger |
| 7,437,013 B2 * | 10/2008 | Anderson ............ G06T 5/002 358/3.26 |
| 7,443,421 B2 | 10/2008 | Stavely et al. |
| 7,446,812 B2 | 11/2008 | Ando et al. |
| 7,525,168 B2 | 4/2009 | Hsieh |
| 7,554,067 B2 | 6/2009 | Zarnoski et al. |
| 7,555,158 B2 | 6/2009 | Park et al. |
| 7,626,626 B2 | 12/2009 | Panicacci |
| 7,671,435 B2 | 3/2010 | Ahn |
| 7,728,351 B2 | 6/2010 | Shim |
| 7,733,402 B2 | 6/2010 | Egawa et al. |
| 7,742,090 B2 | 6/2010 | Street |
| 7,764,312 B2 | 7/2010 | Ono et al. |
| 7,773,138 B2 | 8/2010 | Lahav et al. |
| 7,786,543 B2 | 8/2010 | Hsieh |
| 7,796,171 B2 | 9/2010 | Gardner |
| 7,873,236 B2 | 1/2011 | Li et al. |
| 7,880,785 B2 | 2/2011 | Gallagher |
| 7,884,402 B2 | 2/2011 | Ki |
| 7,906,826 B2 | 3/2011 | Martin et al. |
| 7,952,121 B2 | 5/2011 | Arimoto |
| 7,952,635 B2 | 5/2011 | Lauxtermann |
| 7,982,789 B2 | 7/2011 | Watanabe et al. |
| 8,026,966 B2 | 9/2011 | Altice |
| 8,032,206 B1 | 10/2011 | Farazi et al. |
| 8,094,232 B2 | 1/2012 | Kusaka |
| 8,116,540 B2 | 2/2012 | Dean |
| 8,140,143 B2 | 3/2012 | Picard et al. |
| 8,153,947 B2 | 4/2012 | Barbier et al. |
| 8,159,570 B2 | 4/2012 | Negishi |
| 8,159,588 B2 | 4/2012 | Boemler |
| 8,164,669 B2 | 4/2012 | Compton et al. |
| 8,184,188 B2 | 5/2012 | Yaghmai |
| 8,194,148 B2 | 6/2012 | Doida |
| 8,194,165 B2 | 6/2012 | Border et al. |
| 8,222,586 B2 | 7/2012 | Lee |
| 8,227,844 B2 | 7/2012 | Adkisson |
| 8,233,071 B2 | 7/2012 | Takeda |
| 8,259,228 B2 | 9/2012 | Wei et al. |
| 8,310,577 B1 | 11/2012 | Neter |
| 8,324,553 B2 | 12/2012 | Lee |
| 8,340,407 B2 | 12/2012 | Kalman |
| 8,350,940 B2 | 1/2013 | Smith et al. |
| 8,400,546 B2 | 3/2013 | Itano et al. |
| 8,456,559 B2 | 6/2013 | Yamashita |
| 8,508,637 B2 | 8/2013 | Han et al. |
| 8,514,308 B2 | 8/2013 | Itonaga et al. |
| 8,520,913 B2 | 8/2013 | Dean |
| 8,547,388 B2 | 10/2013 | Cheng |
| 8,575,531 B2 | 11/2013 | Hynecek et al. |
| 8,581,992 B2 | 11/2013 | Hamada |
| 8,594,170 B2 | 11/2013 | Mombers et al. |
| 8,619,163 B2 | 12/2013 | Ogua |
| 8,629,484 B2 | 1/2014 | Ohri et al. |
| 8,634,002 B2 | 1/2014 | Kita |
| 8,648,947 B2 | 2/2014 | Sato et al. |
| 8,723,975 B2 | 5/2014 | Solhusvik |
| 8,754,983 B2 | 6/2014 | Sutton |
| 8,755,854 B2 | 6/2014 | Addison et al. |
| 8,759,736 B2 | 6/2014 | Yoo |
| 8,767,104 B2 | 7/2014 | Makino et al. |
| 8,803,990 B2 | 8/2014 | Smith |
| 8,817,154 B2 | 8/2014 | Manabe et al. |
| 8,902,330 B2 | 12/2014 | Theuwissen |
| 8,908,073 B2 | 12/2014 | Minagawa |
| 8,936,552 B2 | 1/2015 | Kateraas et al. |
| 8,946,610 B2 | 2/2015 | Iwabuchi et al. |
| 8,982,237 B2 | 3/2015 | Chen |
| 9,041,837 B2 | 5/2015 | Li |
| 9,054,009 B2 | 6/2015 | Oike et al. |
| 9,066,017 B2 | 6/2015 | Geiss |
| 9,066,660 B2 | 6/2015 | Watson et al. |
| 9,088,727 B2 | 7/2015 | Trumbo |
| 9,094,623 B2 | 7/2015 | Kawaguchi |
| 9,099,604 B2 | 8/2015 | Roy |
| 9,100,597 B2 | 8/2015 | Hu |
| 9,131,171 B2 | 9/2015 | Aoki et al. |
| 9,232,150 B2 | 1/2016 | Kleekajai et al. |
| 9,270,906 B2 | 2/2016 | Peng et al. |
| 9,344,649 B2 | 5/2016 | Bock |
| 9,497,397 B1 | 11/2016 | Kleekajai et al. |
| 2003/0036685 A1 | 2/2003 | Goodman et al. |
| 2004/0207836 A1 | 10/2004 | Chhibber et al. |
| 2005/0026332 A1 | 2/2005 | Fratti et al. |
| 2006/0274161 A1 | 12/2006 | Ing et al. |
| 2007/0263099 A1 | 11/2007 | Motta et al. |
| 2008/0177162 A1 | 7/2008 | Bae et al. |
| 2008/0315198 A1 | 12/2008 | Jung |
| 2009/0096901 A1 | 4/2009 | Bae et al. |
| 2009/0101914 A1 | 4/2009 | Hirotsu et al. |
| 2009/0146234 A1 | 6/2009 | Luo et al. |
| 2009/0201400 A1 | 8/2009 | Zhang et al. |
| 2010/0134631 A1 | 6/2010 | Voth |
| 2011/0028802 A1 | 2/2011 | Addison et al. |
| 2011/0077531 A1 | 3/2011 | Watson et al. |
| 2011/0080500 A1 | 4/2011 | Wang et al. |
| 2011/0156197 A1 | 6/2011 | Tivarus et al. |
| 2011/0245690 A1 | 10/2011 | Watson et al. |
| 2012/0092541 A1 | 4/2012 | Tuulos et al. |
| 2012/0098964 A1 | 4/2012 | Oggier et al. |
| 2012/0147207 A1 | 6/2012 | Itonaga |
| 2013/0057744 A1 * | 3/2013 | Minagawa ......... H04N 5/35563 348/311 |
| 2013/0068934 A1 * | 3/2013 | Hu ................. H04N 5/347 250/208.2 |
| 2013/0147981 A1 | 6/2013 | Wu |
| 2013/0155271 A1 | 6/2013 | Ishii |
| 2013/0222584 A1 | 8/2013 | Aoki et al. |
| 2014/0049683 A1 | 2/2014 | Guenter |
| 2014/0071321 A1 | 3/2014 | Seyama |
| 2014/0240550 A1 | 8/2014 | Taniguchi |
| 2014/0246568 A1 | 9/2014 | Wan |
| 2014/0247378 A1 | 9/2014 | Sharma et al. |
| 2014/0252201 A1 | 9/2014 | Li et al. |
| 2014/0263951 A1 | 9/2014 | Fan et al. |
| 2014/0267855 A1 | 9/2014 | Fan |
| 2014/0347533 A1 | 11/2014 | Toyoda |
| 2014/0354861 A1 | 12/2014 | Pang |
| 2015/0163392 A1 | 6/2015 | Malone et al. |
| 2015/0163422 A1 | 6/2015 | Fan et al. |
| 2015/0237314 A1 | 8/2015 | Hasegawa |
| 2015/0264241 A1 | 9/2015 | Kleekajai et al. |
| 2015/0264278 A1 | 9/2015 | Kleekajai et al. |
| 2015/0312479 A1 | 10/2015 | McMahon et al. |
| 2015/0350575 A1 | 12/2015 | Agranov et al. |
| 2016/0050379 A1 | 2/2016 | Jiang et al. |
| 2016/0365380 A1 | 12/2016 | Wan |

FOREIGN PATENT DOCUMENTS

| | | |
|---|---|---|
| CN | 101233763 | 7/2008 |
| CN | 101472059 | 7/2009 |
| CN | 101567977 | 10/2009 |
| CN | 101622859 | 1/2010 |
| CN | 101803925 | 8/2010 |
| CN | 102036020 | 4/2011 |
| CN | 102821255 | 12/2012 |
| CN | 103329513 | 9/2013 |
| CN | 103546702 | 1/2014 |
| EP | 2023611 | 2/2009 |

(56) References Cited

FOREIGN PATENT DOCUMENTS

| | | |
|---|---|---|
| EP | 2107610 | 10/2009 |
| EP | 2230690 | 9/2010 |
| JP | S61123287 | 6/1986 |
| JP | 2000059697 | 2/2000 |
| JP | 2001211455 | 8/2001 |
| JP | 2008507908 | 3/2008 |
| JP | 2009021809 | 1/2009 |
| JP | 2009159186 | 7/2009 |
| JP | 201149697 | 3/2011 |
| JP | 2011097646 | 12/2011 |
| JP | 2012019516 | 1/2012 |
| JP | 2012513160 | 6/2012 |
| JP | 2013070240 | 4/2013 |
| JP | 2013529035 | 7/2013 |
| KR | 20030034424 | 5/2003 |
| KR | 20030061157 | 7/2003 |
| KR | 2008/0069851 | 7/2008 |
| KR | 20100008239 | 1/2010 |
| KR | 20100065084 | 6/2010 |
| KR | 20130074459 | 7/2013 |
| TW | 201301881 | 1/2013 |
| WO | WO 06/014641 | 2/2006 |
| WO | WO 2010/120945 | 10/2010 |
| WO | WO 2012/053363 | 4/2012 |
| WO | WO 2012/088338 | 6/2012 |
| WO | WO 2012/122572 | 9/2012 |
| WO | WO 2013/008425 | 1/2013 |
| WO | WO 2013/179018 | 12/2013 |
| WO | WO 2013/179020 | 12/2013 |

OTHER PUBLICATIONS

Elgendi, "On the Analysis of Fingertip Photoplethysmogram Signals," *Current Cardiology Reviews*, 2012, vol. 8, pp. 14-25.

Feng, et al., "On the Stoney Formula for a Thin Film/Substrate System with Nonuniform Substrate Thickness," *Journal of Applied Mechanics*, Transactions of the ASME, vol. 74, Nov. 2007, pp. 1276-1281.

Fu, et al., "Heart Rate Extraction from Photoplethysmogram Waveform Using Wavelet Multui-resolution Analysis," *Journal of Medical and Biological Engineering*, 2008, vol. 28, No. 4, pp. 229-232.

Han, et al., "Artifacts in wearable photoplethysmographs during daily life motions and their reduction with least mean square based active noise cancellation method," *Computers in Biology and Medicine*, 2012, vol. 42, pp. 387-393.

Lopez-Silva, et al., "Heuristic Algorithm for Photoplethysmographic Heart Rate Tracking During Maximal Exercise Test," *Journal of Medical and Biological Engineering*, 2011, vol. 12, No. 3, pp. 181-188.

Santos, et al., "Accelerometer-assisted PPG Measurement During Physical Exercise Using the LAVIMO Sensor System," *Acta Polytechnica*, 2012, vol. 52, No. 5, pp. 80-85.

Sarkar, et al., "Fingertip Pulse Wave (PPG signal) Analysis and Heart Rate Detection," *International Journal of Emerging Technology and Advanced Engineering*, 2012, vol. 2, No. 9, pp. 404-407.

Schwarzer, et al., On the determination of film stress from substrate bending: Stoney's formula and its limits, Jan. 2006, 19 pages.

Yan, et al., "Reduction of motion artifact in pulse oximetry by smoothed pseudo Wigner-Ville distribution," *Journal of Neuro Engineering and Rehabilitation*, 2005, vol. 2, No. 3, pp. 1-9.

Yousefi, et al., "Adaptive Cancellation of Motion Artifact in Wearable Biosensors," 34th Annual International Conference of the IEEE EMBS, San Diego, California, Aug./Sep. 2012, pp. 2004-2008.

U.S. Appl. No. 15/056,752, filed Feb. 29, 2016, Wan.
U.S. Appl. No. 13/782,532, filed Mar. 1, 2013, Sharma et al.
U.S. Appl. No. 13/783,536, filed Mar. 4, 2013, Wan.
U.S. Appl. No. 13/785,070, filed Mar. 5, 2013, Li.
U.S. Appl. No. 13/787,094, filed Mar. 6, 2013, Li et al.
U.S. Appl. No. 13/797,851, filed Mar. 12, 2013, Li.
U.S. Appl. No. 13/830,748, filed Mar. 14, 2013, Fan.
U.S. Appl. No. 14/098,504, filed Dec. 5, 2013, Fan et al.
U.S. Appl. No. 14/207,150, filed Mar. 12, 2014, Kleekajai et al.
U.S. Appl. No. 14/207,176, filed Mar. 12, 2014, Kleekajai et al.
U.S. Appl. No. 14/276,728, filed May 13, 2014, McMahon et al.
U.S. Appl. No. 14/292,599, filed May 30, 2014, Agranov et al.
U.S. Appl. No. 14/462,032, filed Aug. 18, 2014, Jiang et al.
U.S. Appl. No. 14/481,806, filed Sep. 9, 2014, Kleekajai et al.
U.S. Appl. No. 14/481,820, filed Sep. 9, 2014, Lin et al.
U.S. Appl. No. 14/501,429, filed Sep. 30, 2014, Malone et al.
U.S. Appl. No. 14/569,346, filed Dec. 12, 2014, Kestelli et al.
U.S. Appl. No. 14/611,917, filed Feb. 2, 2015, Lee et al.

\* cited by examiner

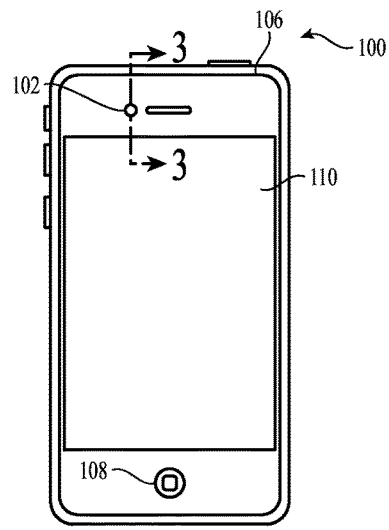
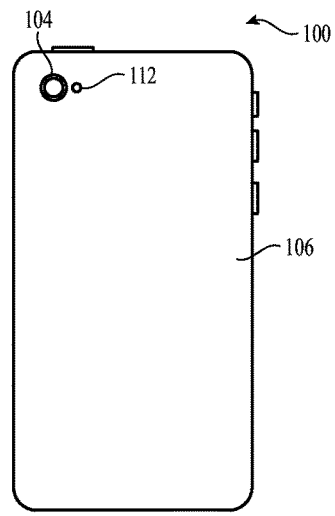
*FIG. 1A*  *FIG. 1B*
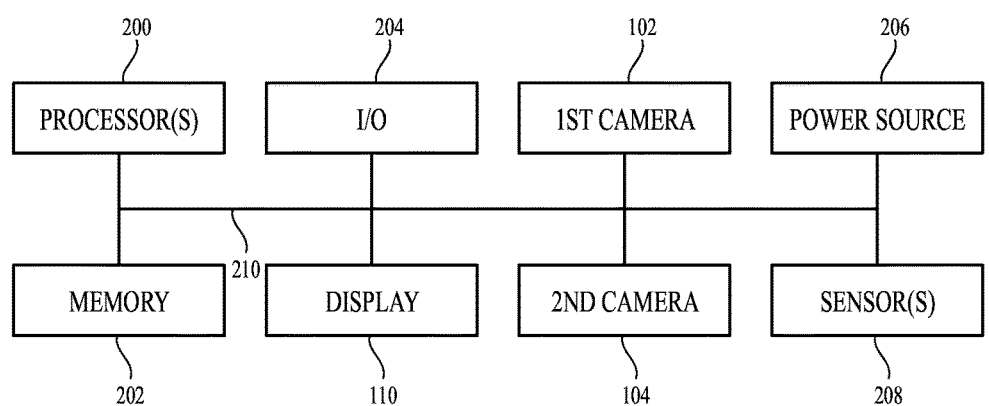
*FIG. 2*

| R | Gr | R | Gr | R | Gr | R | Gr |
|---|----|---|----|---|----|---|----|
| Gb | B | Gb | B | Gb | B | Gb | B |
| R | Gr | R | Gr | R | Gr | R | Gr |
| Gb | B | Gb | B | Gb | B | Gb | B |
| R | Gr | R | Gr | R | Gr | R | Gr |
| Gb | B | Gb | B | Gb | B | Gb | B |
| R | Gr | R | Gr | R | Gr | R | Gr |
| Gb | B | Gb | B | Gb | B | Gb | B |

CHARGE SUMMING IN AN IMAGE SENSOR

CROSS-REFERENCE TO RELATED APPLICATION

This application claims the benefit under 35 U.S.C. §119(e) of U.S. Provisional Patent Application No. 61/907,375, filed Nov. 21, 2013, entitled "Charge Summing in an Image Sensor," the entirety of which is incorporated herein by reference as if fully disclosed herein.

TECHNICAL FIELD

The present invention relates generally to electronic devices, and more specifically, to image sensors for electronic devices.

BACKGROUND

Cameras and other image recording devices often use one or more image sensors, such as a charge-coupled device (CCD) image sensor or a complementary metal-oxide-semiconductor (CMOS) image sensor to capture an image. Each image sensor includes a pixel array and readout circuitry operatively connected to the pixel array to read out the charge or signals produced by pixels in the pixel array. The signals received by the readout circuitry are typically input into analog-to-digital converters (ADC) to convert the analog signals to digital signals. The speed at which the ADCs convert the signals to digital signals is limited, and as the number of pixels in an image sensor increases, the limited speed of the ADCs results in longer readout times for the image sensor. Additional ADCs can be included in an image sensor, but the additional circuits increase the amount of power consumed by the image sensor. Moreover, the readout circuitry can add noise to the signals received from the pixels.

Pixels can be binned or summed together to decrease the readout time of the image sensor, and in some cases to improve the image quality of the image sensor. Binning can be performed in the pixel array or after the signals are read out of the pixel array. Summing the pixels after the pixels have been read out of the pixel array does not decrease the readout time since all of the pixels still have to be read out. Additionally, noise produced by the readout circuitry is summed with the pixel signals, which can reduce the image quality by reducing the signal to noise ratio. Summing the pixels in the pixel array before the pixels are read out can decrease the readout time, but can result in gaps or irregular spacing between the optical centers. The irregular spacing between optical centers can produce lines in the image that are jagged or uneven, and these undesirable jagged lines can be noticeable to a user. The irregular spacing between the optical centers may also result in an overall significantly lower resolution in the final image compared to an image that is digitally scaled down with the same quantity as the amount of pixels being binned.

SUMMARY

In one aspect, an image sensor can include a pixel array having a plurality of pixels. Charge or signals in pixels along a first diagonal direction can be summed together to produce one or more first diagonal summed pairs. Charge or signals in pixels can be summed along a different second diagonal direction to produce one or more second diagonal summed pairs. The direction of the summing can change for every N pairs, where N is an integer greater than zero. The locations of the first and second diagonal summed pairs vary or are distributed across the pixel array. The one or more first diagonal summed pairs and second diagonal summed pairs can then be read out of the pixel array.

In another aspect, at least one first diagonal summed pair can be summed with at least one other first diagonal summed pair within or outside of the pixel array. By way of example only, the summing of the first diagonal summed pairs can be performed in the readout circuitry or by a processor. Similarly, at least one second diagonal summed pair can be summed with at least one other second diagonal summed pair within or outside of the pixel array In another aspect, pixels can be summed in one or more non-diagonal directions within or outside of the pixel array.

In yet another aspect, an electronic device can include an image sensor having a plurality of pixels and readout circuitry operatively connected to the plurality of pixels. A processor can be operatively connected to the readout circuitry and/or the plurality of pixels. The processor can be adapted to produce timing signals that are received by the image sensor to sum pixels along a first diagonal direction to produce one or more first diagonal summed pairs. The processing device may also be adapted to sum pixels along a different second diagonal direction to produce one or more second diagonal summed pairs. The direction of the summing can change for every N pairs where N is an integer greater than zero. The locations of the first and second diagonal summed pairs vary or are distributed across the image sensor.

In another aspect, a method for summing charge in an image sensor having a pixel array that includes plurality of pixels can include summing charge in a portion of the pixels in the pixel array that are positioned in adjacent rows or columns along a first diagonal direction to produce one or more first diagonal summed pairs, changing a direction of summing to a different second diagonal direction, and summing charge in another portion of the pixels in the pixel array that are positioned in adjacent rows or columns along the second diagonal direction to produce one or more second diagonal summed pairs.

BRIEF DESCRIPTION OF THE DRAWINGS

Embodiments of the invention are better understood with reference to the following drawings. The elements of the drawings are not necessarily to scale relative to each other. Identical reference numerals have been used, where possible, to designate identical features that are common to the figures.

FIG. 1A illustrates a front view of an electronic device including one or more cameras;

FIG. 1B depicts a rear view of the electronic device of FIG. 1A;

FIG. 2 illustrates a simplified block diagram of the electronic device of FIG. 1;

FIG. 10 illustrates one example of block 900 shown in FIG. 9;

DETAILED DESCRIPTION

Figure 3:
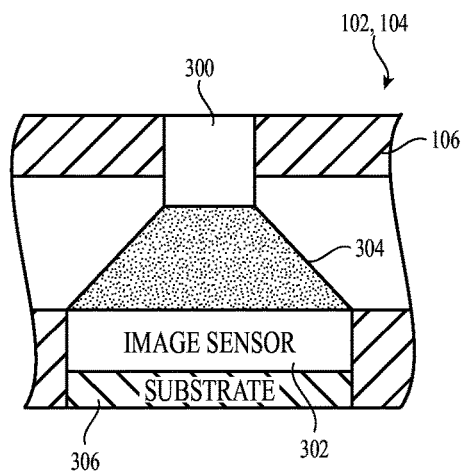
FIG. 3 depicts a cross-section view of the electronic device of FIG. 1A taken along line 3-3 in FIG. 1A.

Embodiments described herein provide a binning or summing method that sums pixels diagonally in the pixel array. The pixels can be summed in a first diagonal direction and in a different second diagonal direction. The direction of the binning can change for every N pairs, where N is an integer greater than zero. Pixels that are summed in the first diagonal direction can be summed together within the pixel array or outside of the pixel array in the voltage or digital domains. Similarly, pixels that are summed in the second diagonal direction can be summed together within the pixel array or outside of the pixel array in the voltage and/or digital domains.

As one example, an image sensor that includes the Bayer color filter array can sum green pixels in a first diagonal direction and in a second diagonal direction in the pixel array using 2×1 binning. The 2×1 green pixels summed diagonally in the first diagonal direction can later be combined in pairs to obtain 2×2 binning of pixels. Similarly, the green pixels binned diagonally in the different second diagonal direction can later be combined in pairs to obtain 2×2 binning of pixels. The pixels summed in the pixel array using 2×1 binning can be pixels in adjacent rows or columns. The direction of the binning can be alternated for every two pairs of green pixels to produce a crosshatch effect that allows for a more gradual trade-off of resolution for higher sensitivity and dynamic range. In some embodiments, the 2×1 binned image can be processed by a larger kernel de-mosaic to produce a higher resolution image with less artifacts compared to 2×2 binning or conventional vertical 2×1 binning. As pixels shrink and approach the diffraction limit for green light, the artifacts from the oblong shape of the 2×1 binned green pixels can become less visible in a final reconstructed image.

Referring now to FIGS. 1A-1B, there are shown front and rear views of an electronic device that includes one or more cameras. The electronic device 100 includes a first camera 102, a second camera 104, an enclosure 106, a display 110, an input/output (I/O) member 108, and an optional flash 112 or light source for the camera or cameras. The electronic device 100 can also include one or more internal components (not shown) typical of a computing or electronic device, such as, for example, one or more processors, memory components, network interfaces, and so on.

In the illustrated embodiment, the electronic device 100 is implemented as a smart telephone. Other embodiments, however, are not limited to this construction. Other types of computing or electronic devices can include one or more cameras, including, but not limited to, a netbook or laptop computer, a tablet computer, a digital camera, a printer, a scanner, a video recorder, and a copier.

As shown in FIGS. 1A-1B, the enclosure 106 can form an outer surface or partial outer surface and protective case for the internal components of the electronic device 106, and may at least partially surround the display 110. The enclosure 106 can be formed of one or more components operably connected together, such as a front piece and a back piece. Alternatively, the enclosure 106 can be formed of a single piece operably connected to the display 110.

The I/O member 108 can be implemented with any type of input or output member. By way of example only, the I/O member 108 can be a switch, a button, a capacitive sensor, or other input mechanism. The I/O member 108 allows a user to interact with the electronic device 100. For example, the I/O member 108 may be a button or switch to alter the volume, return to a home screen, and the like. The electronic device can include one or more input members or output members, and each member can have a single I/O function or multiple I/O functions.

The display 110 can be operably or communicatively connected to the electronic device 100. The display 110 can be implemented with any type of suitable display, such as a retina display or an active matrix color liquid crystal display. The display 110 can provide a visual output for the electronic device 100 or function to receive user inputs to the electronic device. For example, the display 110 can be a multi-touch capacitive sensing touchscreen that can detect one or more user touch and/or force inputs.

The electronic device 100 can also include a number of internal components. FIG. 2 illustrates one example of a simplified block diagram of the electronic device 100. The electronic device can include one or more processors 200, storage or memory components 202, input/output interface 204, power sources 206, and sensors 208, each of which will be discussed in turn below.

The one or more processors 200 can control some or all of the operations of the electronic device 100. The processor(s) 200 can communicate, either directly or indirectly, with substantially all of the components of the electronic device 100. For example, one or more system buses 210 or other communication mechanisms can provide communication between the processor(s) 200, the cameras 102, 104, the display 110, the I/O member 108, or the sensors 208. The processor(s) 200 can be implemented as any electronic device capable of processing, receiving, or transmitting data or instructions. For example, the one or more processors 200 can be a microprocessor, a central processing unit (CPU), an application-specific integrated circuit (ASIC), a digital signal processor (DSP), or combinations of multiple such devices. As described herein, the term "processor" is meant to encompass a single processor or processing unit, multiple processors, multiple processing units, or other suitably configured computing element or elements.

The memory 202 can store electronic data that can be used by the electronic device 100. For example, the memory 202 can store electrical data or content such as, for example, audio files, document files, timing signals, and image data. The memory 202 can be configured as any type of memory. By way of example only, memory 202 can be implemented as random access memory, read-only memory, Flash memory, removable memory, or other types of storage elements, in any combination.

The input/output interface 204 can receive data from a user or one or more other electronic devices. Additionally, the input/output interface 204 can facilitate transmission of data to a user or to other electronic devices. For example, in embodiments where the electronic device 100 is a smart telephone, the input/output interface 204 can receive data from a network or send and transmit electronic signals via a wireless or wired connection. Examples of wireless and wired connections include, but are not limited to, cellular, WiFi, Bluetooth, and Ethernet. In one or more embodiments, the input/output interface 204 supports multiple network or communication mechanisms. For example, the input/output interface 204 can pair with another device over a Bluetooth network to transfer signals to the other device while simultaneously receiving signals from a WiFi or other wired or wireless connection.

The power source 206 can be implemented with any device capable of providing energy to the electronic device 100. For example, the power source 206 can be a battery or a connection cable that connects the electronic device 100 to another power source such as a wall outlet.

The sensors 208 can by implemented with any type of sensors. Examples of sensors include, but are not limited to, audio sensors (e.g., microphones), light sensors (e.g., ambient light sensors), gyroscopes, and accelerometers. The sensors 208 can be used to provide data to the processor 200, which may be used to enhance or vary functions of the electronic device.

As described with reference to FIGS. 1A and 1B, the electronic device 100 includes one or more cameras 102, 104 and optionally a flash 112 or light source for the camera or cameras. FIG. 3 is a simplified cross-section view of the camera 102 taken along line 3-3 in FIG. 1A. Although FIG. 3 illustrates the first camera 102, those skilled in the art will recognize that the second camera 104 can be substantially similar to the first camera 102. In some embodiments, one camera may include a global shutter configured image sensor and one camera can include a rolling shutter configured image sensor. In other examples, one camera can include an image sensor with a higher resolution than the image sensor in the other camera, or the image sensors can be configured as two different types of image sensors (e.g., CMOS and CCD).

The cameras 102, 104 include an imaging stage 300 that is in optical communication with an image sensor 302. The imaging stage 300 is operably connected to the enclosure 106 and positioned in front of the image sensor 302. The imaging stage 300 can include conventional elements such as a lens, a filter, an iris, and a shutter. The imaging stage 300 directs, focuses or transmits light 304 within its field of view onto the image sensor 302. The image sensor 302 captures one or more images of a subject scene by converting the incident light into electrical signals.

The image sensor 302 is supported by a support structure 306. The support structure 306 can be a semiconductor-based material including, but not limited to, silicon, silicon-on-insulator (SOI) technology, silicon-on-sapphire (SOS) technology, doped and undoped semiconductors, epitaxial layers formed on a semiconductor substrate, well regions or buried layers formed in a semiconductor substrate, and other semiconductor structures.

Various elements of imaging stage 300 or image sensor 302 can be controlled by timing signals or other signals supplied from a processor or memory, such as processor 200 in FIG. 2. Some or all of the elements in the imaging stage 300 can be integrated into a single component. Additionally, some or all of the elements in the imaging stage 300 can be integrated with the image sensor 302, and possibly one or more additional elements of the electronic device 100, to form a camera module. For example, a processor or a memory may be integrated with the image sensor 302 in some embodiments.

Figure 4:
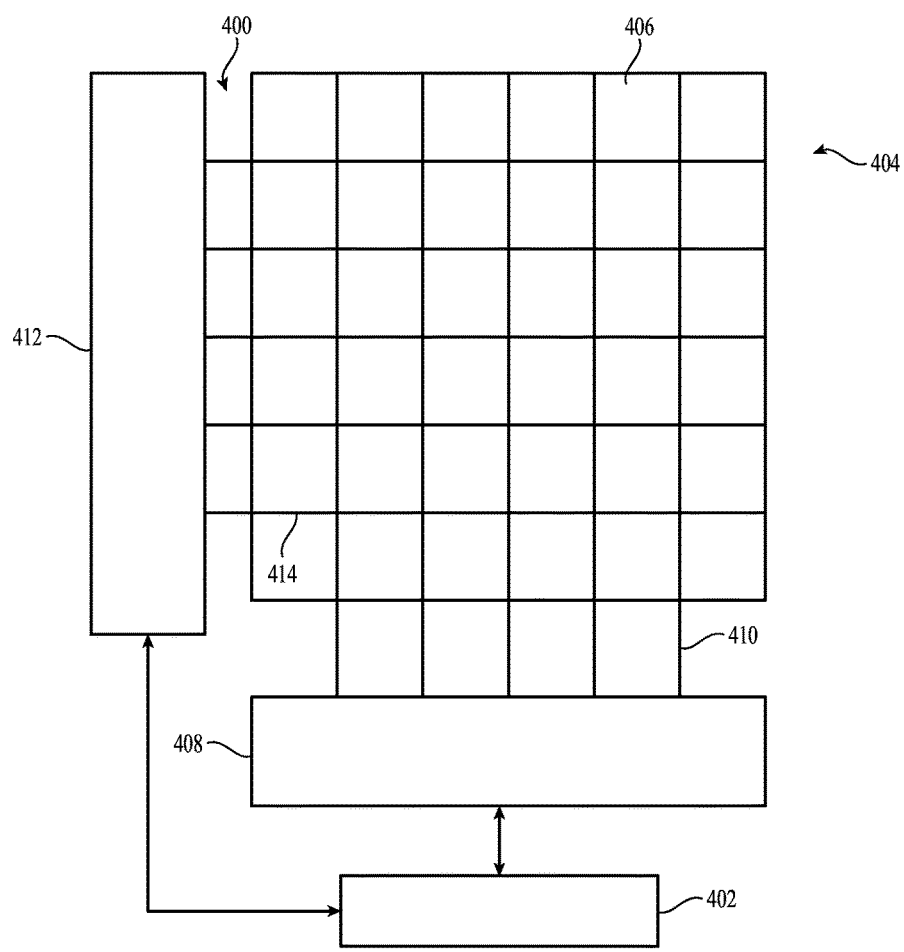
FIG. 4 illustrates a simplified block diagram of one example of an image sensor that is suitable for use as image sensor 302.

Referring now to FIG. 4, there is shown a simplified block diagram of one example of an image sensor suitable for use as image sensor 302 shown in FIG. 3. The illustrated image sensor is a CMOS image sensor. Other embodiments can include a different type of image sensor, such as, for example, a CCD image sensor.

The image sensor 400 can include an image processor 402 and an imaging area 404. The imaging area 404 can be implemented as a pixel array that includes pixels 406. In the illustrated embodiment, the pixel array is configured in a row and column arrangement. However, other embodiments are not limited to this configuration. The pixels in a pixel array can be arranged in any suitable configuration, such as, for example, a hexagon configuration.

The imaging area 404 may be in communication with a column select 408 through one or more column select lines 410 and a row select 412 through one or more row select lines 414. The row select 412 selectively activates a particular pixel 406 or group of pixels, such as all of the pixels 406 in a certain row. The column select 408 selectively receives the data output from the select pixels 406 or groups of pixels (e.g., all of the pixels with a particular column).

The row select 412 and/or the column select 408 may be in communication with the image processor 402. The image processor 402 can provide timing signals to the row select 412 and the column select 408 to transfer or readout charge or signals (i.e., data) from the photodetectors (not shown) in the pixels 406. The image processor 402 can process data from the pixels 406 and provide that data to the processor 200 and/or other components of the electronic device 100. It should be noted that in some embodiments, the image processor 402 can be incorporated into the processor 200 or separate therefrom.

Figure 5:
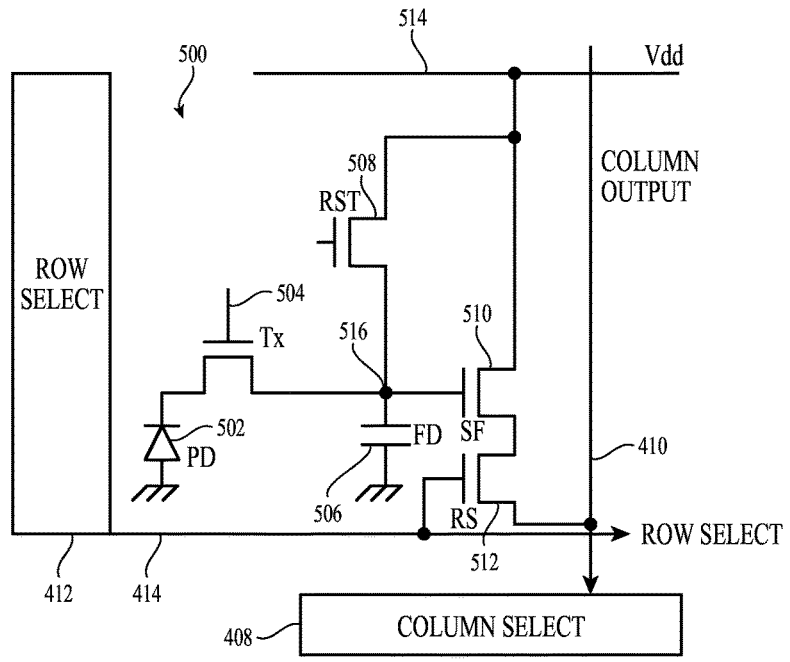
FIG. 5 depicts a simplified schematic view of a pixel suitable for use in an image sensor.

Referring now to FIG. 5, there is shown a simplified schematic view of a pixel that is suitable for use as pixels 406 shown in FIG. 4. The pixel 500 includes a photodetector (PD) 502, a transfer transistor (TX) 504, a sense region 506, a reset (RST) transistor 508, a readout (SF) transistor 510, and a row select (RS) transistor 512. The sense region 506 is represented as a capacitor in the illustrated embodiment because the sense region 506 can temporarily store charge received from the photodetector 502. As described below, after charge is transferred from the photodetector 502, the charge can be stored in the sense region 506 until the gate of the row select transistor 512 is pulsed.

One terminal of the transfer transistor 504 is connected to the photodetector 502 while the other terminal is connected to the sense region 506. One terminal of the reset transistor 508 and one terminal of the readout transistor 510 are connected to a supply voltage (Vdd) 514. The other terminal of the reset transistor 508 is connected to the sense region 506, while the other terminal of the readout transistor 510 is connected to a terminal of the row select transistor 512. The other terminal of the row select transistor 512 is connected to an output line 410.

By way of example only, in one embodiment the photodetector 502 is implemented as a photodiode (PD) or pinned photodiode, the sense region 506 as a floating diffusion (FD), and the readout transistor 510 as a source follower transistor (SF). The photodetector 502 can be an electron-based photodiode or a hole based photodiode. It should be noted that the term photodetector as used herein is meant to encompass substantially any type of photon or light detecting component, such as a photodiode, pinned photodiode, photogate, or other photon sensitive region. Additionally, the term sense region as used herein is meant to encompass substantially any type of charge storing or charge converting region.

Those skilled in the art will recognize that the pixel 500 can be implemented with additional or different components in other embodiments. For example, a row select transistor can be omitted and a pulsed power supply mode used to select the pixel, the sense region can be shared by multiple photodetectors and transfer transistors, or the reset and readout transistors can be shared by multiple photodetectors, transfer gates, and sense regions.

When an image is to be captured, an integration period for the pixel begins and the photodetector 502 accumulates photo-generated charge in response to incident light. When the integration period ends, the accumulated charge in the photodetector 502 is transferred to the sense region 506 by selectively pulsing the gate of the transfer transistor 504. Typically, the reset transistor 508 is used to reset the voltage on the sense region 506 (node 516) to a predetermined level prior to the transfer of charge from the photodetector 502 to the sense region 506. When charge is to be readout of the pixel, the gate of the row select transistor is pulsed through the row select 412 and row select line 414 to select the pixel (or row of pixels) for readout. The readout transistor 510 senses the voltage on the sense region 506 and the row select transistor 512 transmits the voltage to the output line 410. The output line 410 is connected to readout circuitry and (optionally an image processor) through the output line 410 and the column select 408.

In some embodiments, an image capture device, such as a camera, may not include a shutter over the lens, and so the image sensor may be constantly exposed to light. In these embodiments, the photodetectors may have to be reset or depleted before a desired image is to be captured. Once the charge from the photodetectors has been depleted, the transfer gate and the reset gate are turned off, isolating the photodetectors. The photodetectors can then begin integration and collecting photo-generated charge.

Figure 6:
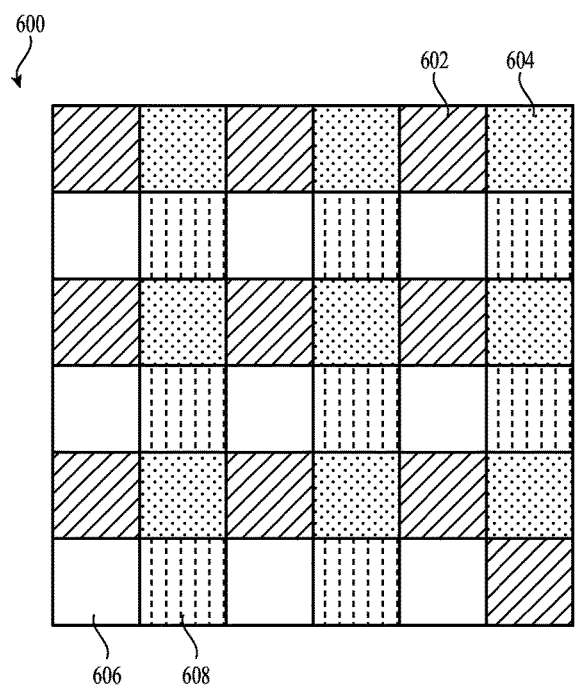
FIG. 6 illustrates one example of a color filter array suitable for use with an image sensor.

In general, photodetectors detect light with little or no wavelength specificity, making it difficult to identify or separate colors. When color separation is desired, a color filter array can be disposed over the imaging area to filter the wavelengths of light sensed by the photodetectors in the imaging area. A color filter array is a mosaic of filter elements with each filter element typically disposed over a respective pixel. A filter element restricts the wavelengths of light detected by a photodetector, which permits color information in a captured image to be separated and identified. FIG. 6 illustrates one example of a color filter array suitable for use with an image sensor in an embodiment. The color filter array (CFA) 600 includes filter elements 602, 604, 606, 608. Although only a limited number of filter elements are shown, those skilled in the art will recognize that a CFA can include thousands or millions of filter elements.

In one embodiment, each filter element restricts light wavelengths. In another embodiment, some of the filter elements filter light wavelengths while other filter elements are panchromatic. A panchromatic filter element can have a wider spectral sensitivity than the spectral sensitivities of the other filter elements in the CFA. For example, a panchromatic filter element can have a high sensitivity across the entire visible spectrum. A panchromatic filter element can be implemented, for example, as a neutral density filter or a color filter. Panchromatic filter elements can be suitable in low level lighting conditions, where the low level lighting conditions can be the result of low scene lighting, short exposure time, small aperture, or other situations where light is restricted from reaching the image sensor.

Figure 7:
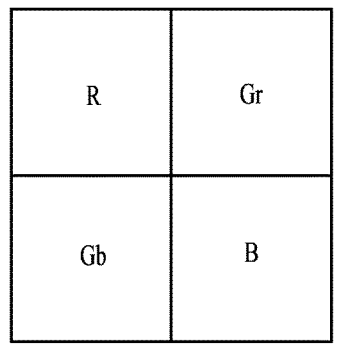
FIG. 7 depicts a Bayer color filter array pattern.

Color filter arrays can be configured in a number of different mosaics. The color filter array 600 can be implemented as a red (R), green (G), and blue (B) color filter array or a cyan (C), magenta (M), yellow (Y) color filter array. The Bayer pattern is a well know color filter array pattern. The Bayer color filter array filters light in the red (R), green (G), and blue (B) wavelengths ranges (see FIG. 7). The Bayer color filter pattern includes two green color filter elements (Gr and Gb), one red color filter element (R), and one blue color filter element (B). The group of four filter elements is tiled or repeated over the pixels in an imaging area to form the color filter array.

Figure 8:
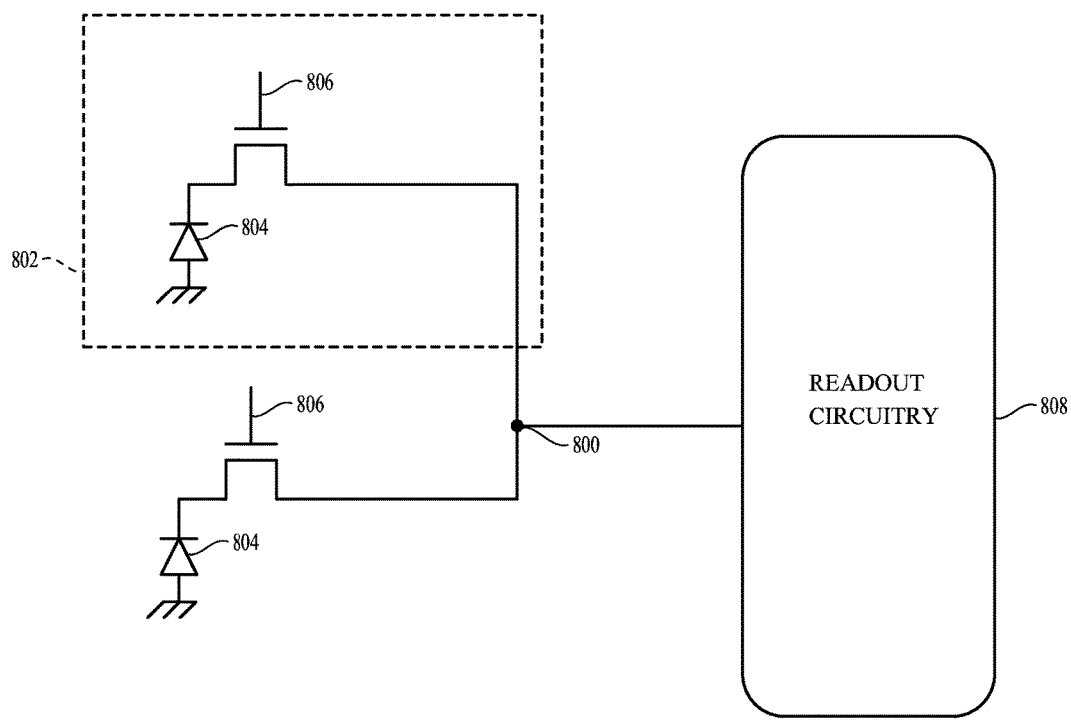
FIG. 8 depicts one example of a shared pixel architecture.

The accumulated charge or signal can be read out of each pixel individually, read out of groups of two or more pixels, or read out of all of the pixels simultaneously depending on the construction of the pixel array and the associated readout circuitry. In some embodiments, each individual pixel is connected to read out circuitry, while in other embodiments two or more pixels are operatively connected to and share the readout circuitry. FIG. 8 depicts one example of a shared pixel architecture. In the illustrated embodiment, two pixels are connected to a shared common node 800. Each pixel 802 includes a photodetector 804 and a transfer transistor 806 connected between the photodetector 804 and the common node 800. Readout circuitry 808 can be connected to the common node 800. Since the readout circuitry 808 is connected to the common node 800, the pixels share the readout circuitry 808. By way of example only, the readout circuitry 808 can include a sense region, a reset transistor, and a readout transistor that can be configured as shown in FIG. 5. The sense region, the reset transistor and the readout transistor can be connected to the common node 800. A row select transistor can be connected to the readout transistor.

The gates of each transfer transistor 806 can be selectively pulsed in one embodiment, allowing charge from one photodetector 804 to transfer to the common node 800. Since the transfer transistors 806 can each be selectively pulsed, the charge from one pixel or from both pixels can be transferred separately or simultaneously to the common node 800. Thus, the accumulated charge in both pixels can be binned or summed together by transferring the charge to the common node, either separately or simultaneously, before the readout circuitry 808 reads the charge from the common node 800. The summed charge can then be readout using some or all of the components in the readout circuitry 808.

Charge binning or summing can be performed in a CMOS image sensor using different techniques in other embodiments. Charge summing can also be performed in other types of image sensors. As one example, charge summing can be performed in a CCD image sensor in the vertical CCDs and/or in the horizontal CCD using known methods for transferring and shifting charge.

Figure 9:
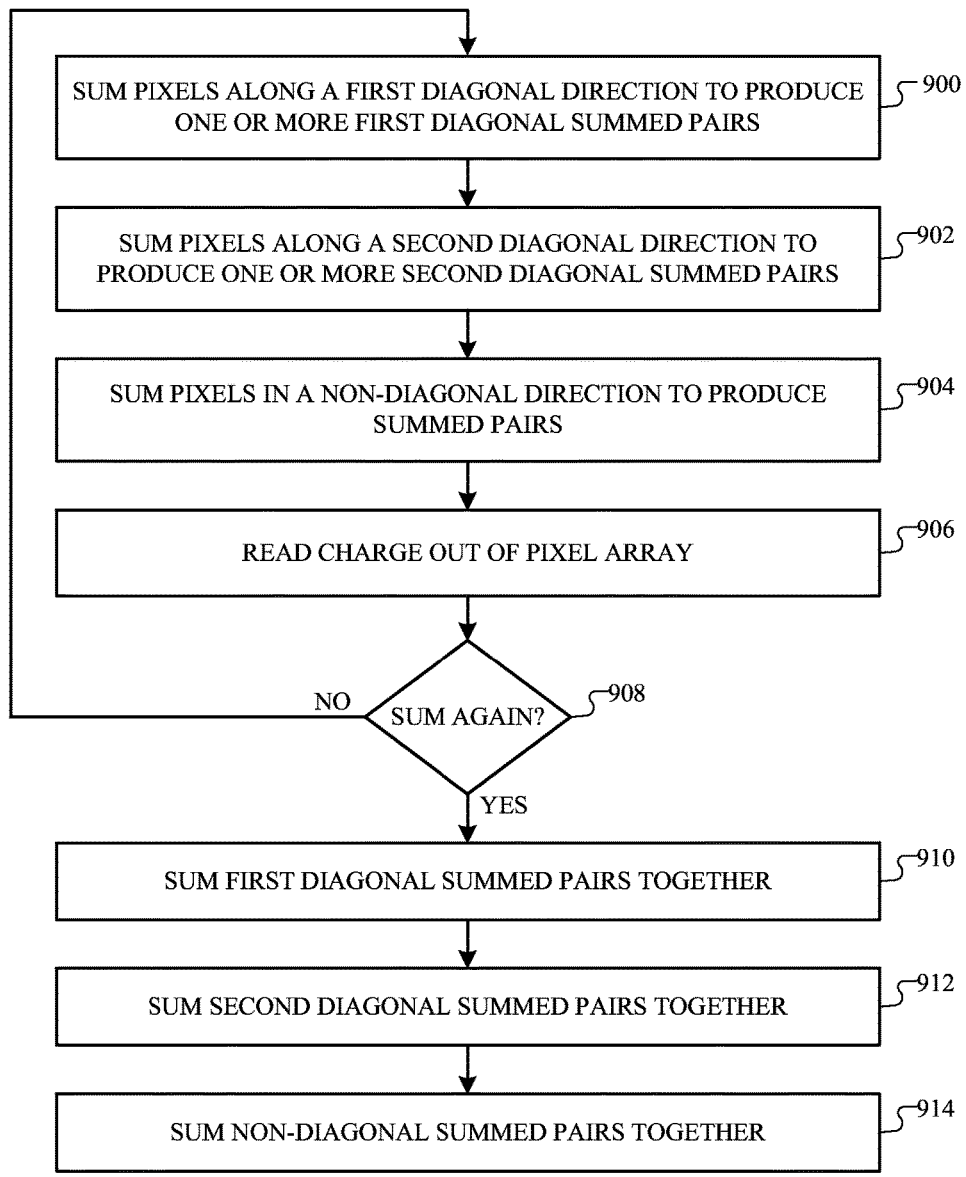
FIG. 9 is a flowchart of an example method for summing charge.

Charge summing can occur in the same color plane or in multiple color planes. FIG. 9 is a flowchart of an example method for summing charge. Initially, as shown in block 900, pixels can be summed along a first diagonal direction to produce one or more first diagonal summed pairs. In one embodiment, the pixels are in adjacent positions (e.g., rows or columns) to each other in the pixel array. In other embodiments, the pixels are not adjacent to each other. The pixels can be arranged in lines, such as in rows or columns, can abut each other, can be located near each other, and/or be situated in the pixel array.

FIG. 10 illustrates pixels that can be summed in a first diagonal direction. Two pixels in adjacent rows are summed together to produce first diagonal summed pairs 1000. In the illustrated embodiment, the summed pixels represent the same color, such as green. The first diagonal summed pixels are known as a 2×1 combination.

Figure 11:
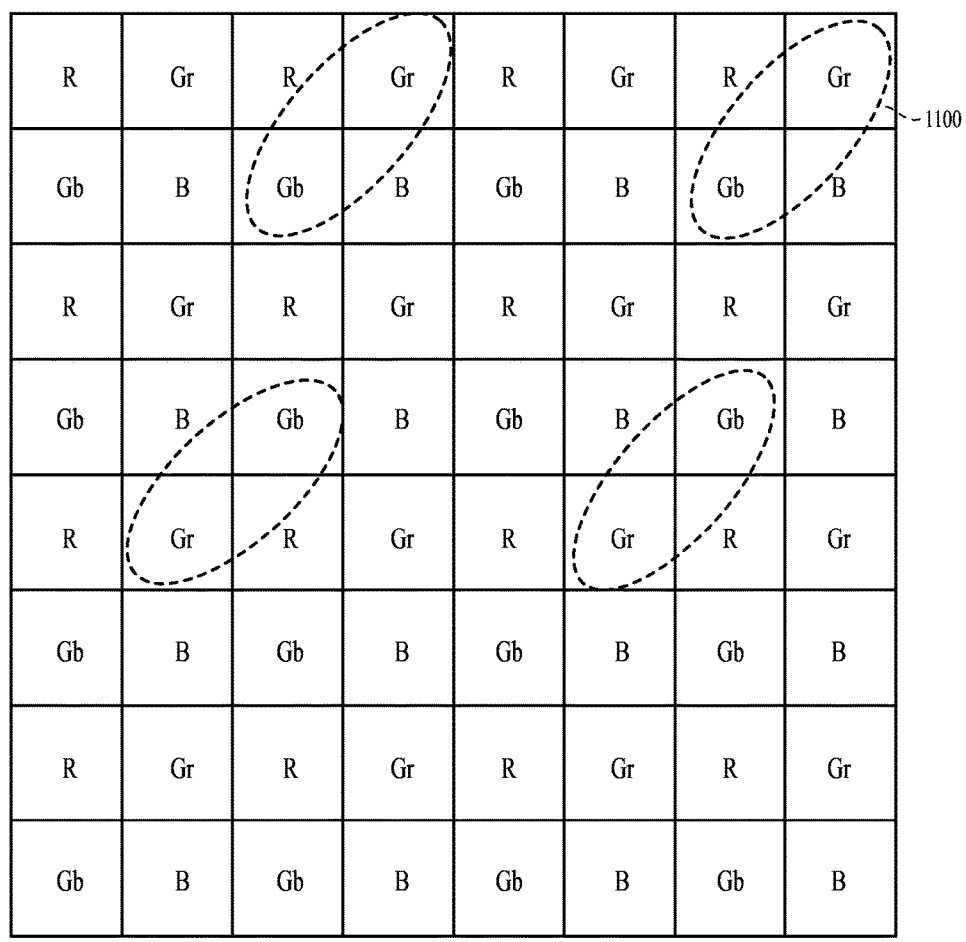
FIG. 11 depicts one example of block 902 shown in FIG. 9.

Next, as shown in block 902 of FIG. 9, pixels can be summed along a different second diagonal direction to produce one or more second diagonal summed pairs. The pixels may or may not be adjacent to each other in the pixel array. FIG. 11 illustrates pixels that can be summed in a second diagonal direction. In the illustrated embodiment, two pixels in adjacent rows are summed together to produce second diagonal summed pairs 1100. Like the embodiment shown in FIG. 10, the summed pixels represent the color green and the second diagonal summed pixels are known as a 2×1 combination.

Figure 12:
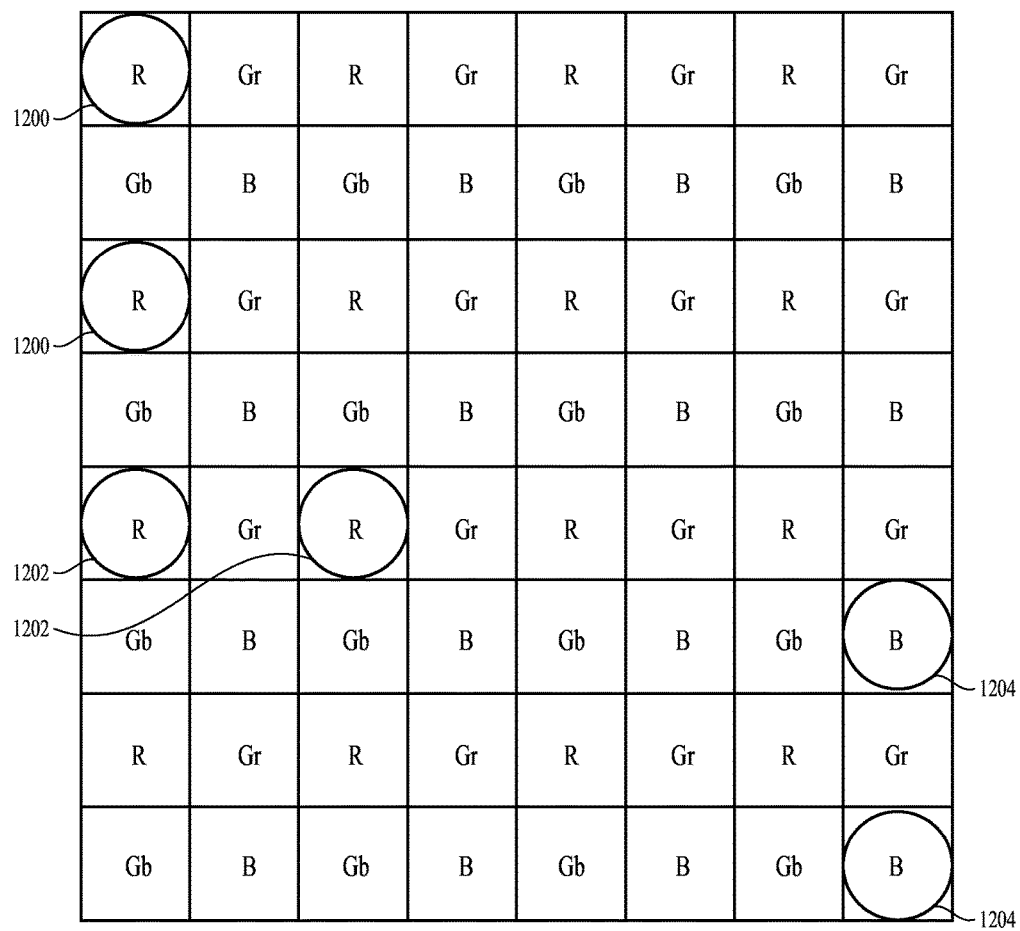
FIG. 12 illustrates one example of block 904 shown in FIG. 9.

Pixels can then be summed along a non-diagonal direction to produce summed pixels (block 904 in FIG. 9). By way of example only, pixels 1200 within a column can be summed and/or pixels 1202 within a row can be summed (see FIG. 12). In the illustrated embodiment, the summed pixels image the same color, such as the color red and/or the color blue. The summed pixels are known as a 2×1 combination. In some embodiments, the summed pixels can be summed together to produce a 2×2 combination.

The charge can then be read out of the pixel array, as shown in block 906. A determination can be made at block 908 as to whether or not the first diagonal summed pairs, second diagonal summed pairs, and/or summed pixels are to be summed again. If not, the method returns to block 900. When the diagonal summed pixels are to be summed again, the process continues at block 910 where two first diagonal summed pairs 1300 can be summed together (see FIG. 13). Additionally or alternatively, two second diagonal summed pairs 1302 can be summed together. Summing the first and/or second diagonal summed pairs is known as a 2×2 combination. The summing of diagonal summed pairs can be performed by a processor when the diagonal pairs are summed together after the charge has been read out of the pixel array. For example, processor 202 and/or processor 402 can sum diagonal summed pairs together.

Additionally, in some embodiments, summed pairs (i.e., pixels summed in a non-diagonal direction) can be summed together at block 914.

Figure 13:
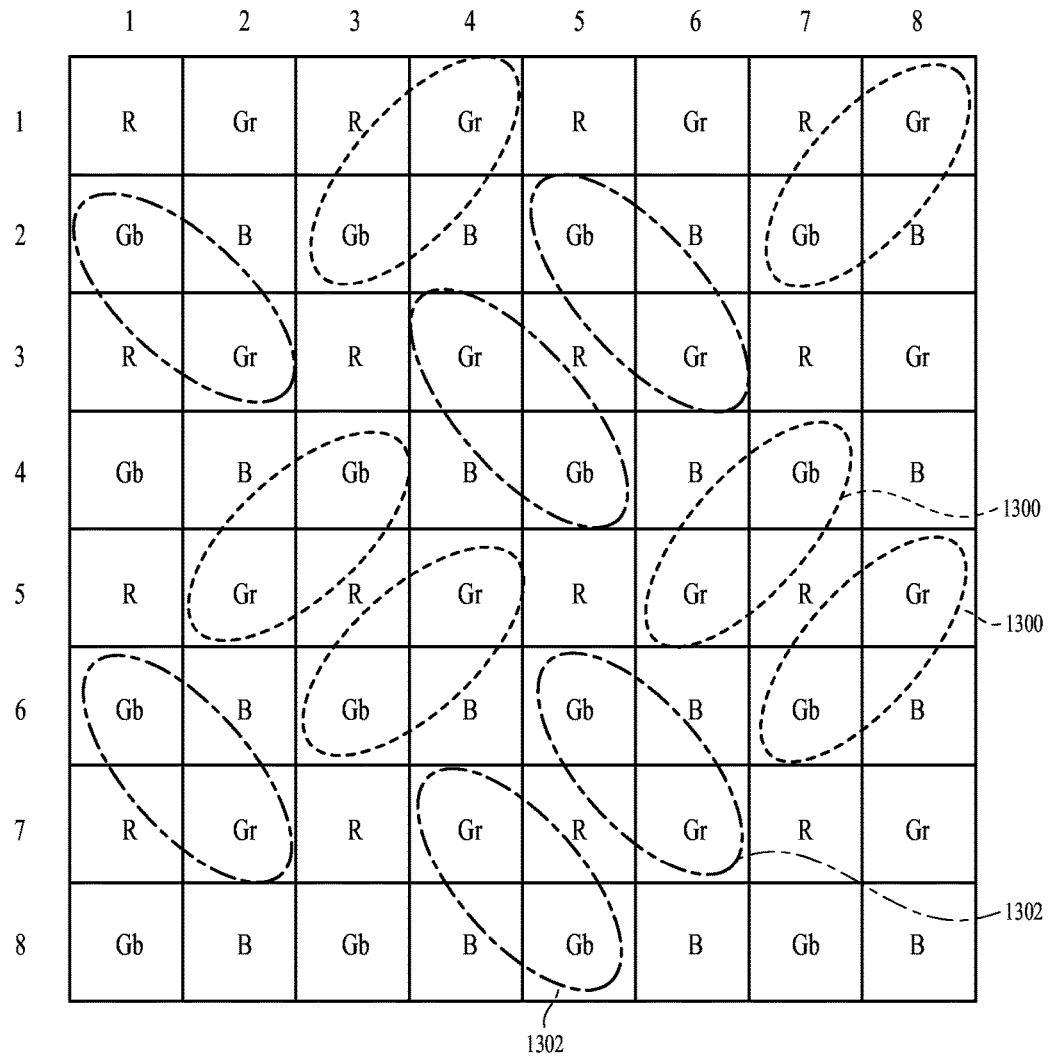
FIG. 13 depicts one example of blocks 910 and 912 shown in FIG. 9.

FIG. 13 illustrates the pixels that may be summed at blocks 900 and 902 and the summed pairs that can be summed at blocks 910 and 912. First diagonal summed pixels 1300 can be summed together (e.g., block 910) while second diagonal summed pixels 1302 may be summed together (e.g., block 912). In the illustrated embodiment, the direction of the diagonal binning or summing alternates to produce a crosshatch effect. Also, in rows 1, 3, 5, and 7 the direction in which the green pixels are summed is the same while in rows 2, 4, 6, and 8 the direction alternates every green pixel. Similarly, the direction in which the green pixels are summed in columns 1, 3, 5, and 7 is the same while the direction alternates in columns 2, 4, 6, and 8.

In other embodiments, pixels can be summed in diagonal directions with different summing patterns. The direction of the diagonal summing can change every N pixels, where N is an integer greater than zero. For example, the direction of the diagonal summing can change every pixel, every other pixel, or every third or fifth pixel. Thus, the locations of the first and second diagonal summed pairs vary or are distributed across the pixel array. The value of N can be based at least in part on the filter pattern in a color filter array.

Summing pixels in a 2×1 combination can reduce Moiré patterns, reduce the readout time because not all of the pixels are readout, and can improve image quality. Summing a second time to produce a 2×2 combination can increase image resolution compared to prior art summing methods and can result in a more even distribution of the colors. For example, with the Bayer pattern shown in FIGS. 7 and 12, the summed greens have a more even distribution and a reasonable distance to the reds and blues when the signals are processed by a Bayer demosaicing algorithm.

Other embodiments can perform the method shown in FIG. 9 differently. For example, blocks can be added, deleted, or performed in a different order. As one example, block 904 and/or block 914 can be omitted in some embodiments. As another example, blocks 910 and 912 can be performed before the charge is read out of the pixel array at block 906. The charge summing can occur in the pixel array in the charge domain, partly in the pixel array in the charge domain and partly in the readout circuitry in the voltage domain, or entirely outside of the pixel array and readout circuitry in the digital domain, or in other combinations.

For example, in one embodiment with a Bayer color filter array pattern, only the green pixels may be binned diagonally. The red pixels and/or the blue pixels can be binned either vertically or horizontally. In embodiments that replace some or all of the green pixels with clear or panchromatic pixels in the Bayer color filter array pattern, only the panchromatic and/or green pixels can be binned diagonally. The red pixels and/or the blue pixels may be binned either vertically or horizontally. The panchromatic pixels can be binned with the green pixels.

Some embodiments can include an image sensor that is configured to provide depth information using asymmetrically shielded photodetectors. The asymmetrically shielded photodetectors can be created by shielding a first portion 1402 (e.g., approximately half) of the photodetector, while the remaining portion of the photodetector 1404 is not shielded. This causes the pixel to be more sensitive to light from the light-detecting portion 1404 (e.g., the other half). The photodetectors can be asymmetrical in at least one direction (e.g., horizontal) with respect to neighboring pixels.

Figure 14:
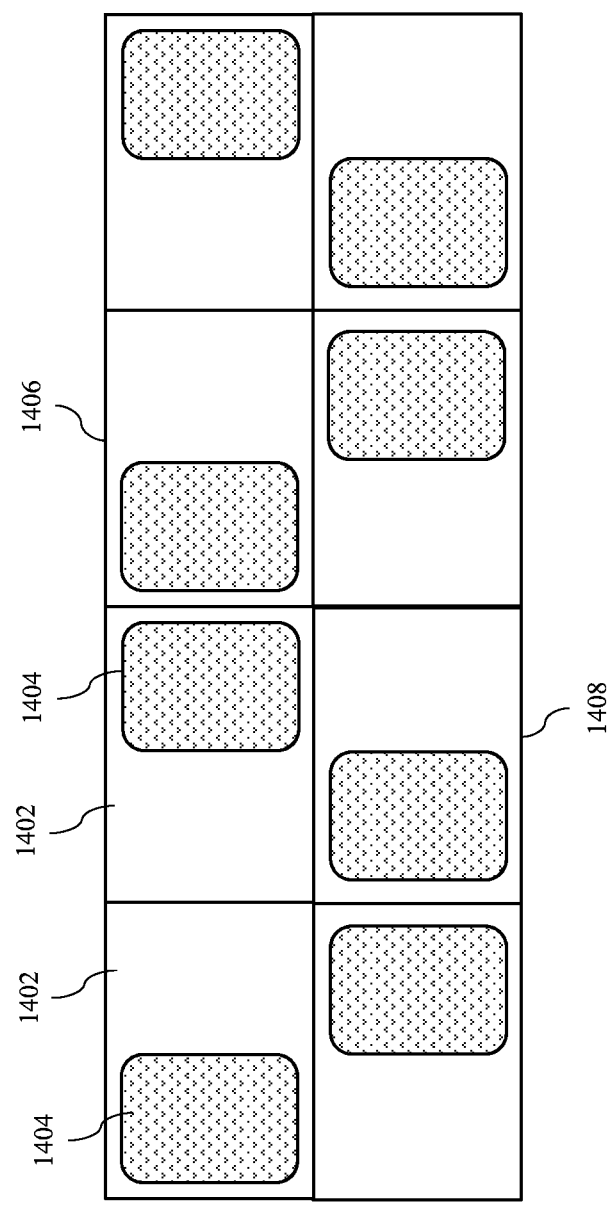
FIG. 14 illustrates a top view of asymmetrical photodetectors that can use the method for summing charge shown in FIG. 9.

If the shielded pixel is in a color plane which will be binned diagonally (e.g., a green pixel or a panchromatic pixel), the shielded pixel is binned with another pixel which has the same shield configuration. For example, as shown in FIG. 14, the charge in pixels 1406 and 1408 can be summed diagonally. Binning two pixels with the same shield configuration diagonally increases the resulting depth signal, which can be beneficial in low light conditions. Those skilled in the art will recognize that similar results may be obtained with different micro-lens designs.

Various embodiments have been described in detail with particular reference to certain features thereof, but it will be understood that variations and modifications can be effected within the spirit and scope of the disclosure. For example, embodiments described herein sum charge along different diagonal directions in 2×1 and 2×2 combinations. Other embodiments can sum charge along different diagonal directions in different combinations, such as, for example, a 3×3 combination. Additionally or alternatively, colors other than green can be summed diagonally.

And even though specific embodiments have been described herein, it should be noted that the application is not limited to these embodiments. In particular, any features described with respect to one embodiment may also be used in other embodiments, where compatible. Likewise, the features of the different embodiments may be exchanged, where compatible.

What is claimed is:

1. A method for summing charge in an image sensor having a pixel array that includes plurality of pixels, the method comprising:
    summing charge in pixels along a first diagonal direction to produce two or more first diagonal summed pairs, wherein the charge in each pixel is associated with a first color and the charge in the two or more first diagonal summed pairs is associated with the first color;
    summing charge in pixels along a different second diagonal direction to produce two or more second diagonal summed pairs, wherein the charge in each pixel is associated with the first color and the charge in the two or more second diagonal summed pairs is associated with the first color;
    summing charge in pixels along one or more non-diagonal directions to produce two or more summed pairs, wherein the charge in each pixel is associated with a second color and the charge in the two or more summed pairs is associated with the second color;
    reading the two or more first diagonal summed pairs, the two or more second diagonal summed pairs, and the two or more summed pairs out of the pixel array;
    summing together one first diagonal summed pair associated with the first color and another first diagonal summed pair associated with the first color;
    summing together one second diagonal summed pair associated with the first color and another second diagonal summed pair associated with the first color; and
    summing together one summed pair associated with the second color and another summed pair associated with the second color.

2. The method as in claim 1, wherein locations of the first and second diagonal summed pairs are distributed across the pixel array.

3. The method as in claim 1, wherein summing charge in pixels along a first diagonal direction comprises summing charge in two pixels in adjacent positions along a first diagonal direction.

4. The method as in claim 3, wherein summing charge in two pixels in adjacent positions along a first diagonal direction comprises summing charge in two pixels in adjacent rows along a first diagonal direction.

5. The method as in claim 1, wherein summing charge in pixels along a different second diagonal direction comprises summing charge in two pixels in adjacent positions along a different second diagonal direction.

6. The method as in claim 5, wherein summing charge in two pixels in adjacent positions along a different second diagonal direction comprises summing charge in two pixels in adjacent rows along a different second diagonal direction.

7. The method as in claim 1, wherein summing charge in pixels along one or more non-diagonal directions comprises summing charge in two pixels along a vertical direction.

8. The method as in claim 1, wherein:
    the one first diagonal summed pair and the other first diagonal summed pair are summed together in a digital domain; and
    the one second diagonal summed pair and the other second diagonal summed pair are summed together in the digital domain.

9. The method as in claim 1, wherein:
    the one first diagonal summed pair and the other first diagonal summed pair are summed together in a voltage domain; and
    the one second diagonal summed pair and the other second diagonal summed pair are summed together in the voltage domain.

10. The method as in claim 1, wherein the first and second diagonal directions alternate for every N diagonal summed pairs, where N is an integer greater than zero.

11. The method as in claim 1, further comprising:
    summing charge in pixels along one or more non-diagonal directions to produce two or more summed pairs, wherein the charge in each pixel is associated with a third color and the charge in the two or more summed pairs is associated with the third color;
    reading the two or more summed pairs out of the pixel array; and
    summing together one summed pair associated with the third color and another summed pair associated with the third color.

12. An electronic device, comprising:
    an image sensor including a plurality of pixels;
    readout circuitry operatively connected to the pixel array; and
    a processor operatively connected to the readout circuitry and to the image sensor, wherein the processor is adapted to produce timing signals that are received by the image sensor to:
        sum charge in pixels associated with a first color along a first diagonal direction to produce two or more first diagonal summed pairs having charge associated with the first color;
        sum charge in pixels associated with a second color along a different second diagonal direction to produce two or more second diagonal summed pairs having charge associated with the second color;
        sum charge in pixels associated with a third color along one or more non-diagonal directions to produce two or more first summed pairs having charge associated with the third color; and
        sum charge in pixels associated with a fourth color along one or more non-diagonal directions to produce two or more second summed pairs having charge associated with the fourth color.

13. The electronic device as in claim 12, wherein the processor is further adapted to produce timing signals that are received by the readout circuitry to sum first diagonal summed pairs together after the two or more first diagonal summed pairs are read out of the pixel array and to sum second diagonal summed pairs together after the two or more second diagonal summed pairs are read out of the pixel array.

14. The electronic device as in claim 12, wherein the processor is further adapted to produce timing signals that are received by the readout circuitry to sum first summed pairs together after the two or more first summed pairs are readout of the pixel array and to sum second summed pairs together after the two or more second summed pairs are readout of the pixel array.

15. The electronic device as in claim 12, wherein the first color and the second color comprise a same color.

16. A method for summing charge in an image sensor having a pixel array that includes plurality of pixels, the method comprising:
    summing charge in a first portion of the pixels in the pixel array that are positioned in adjacent rows or columns along a first diagonal direction to produce two or more first diagonal summed pairs, wherein the charge in each pixel is associated with a first color and the charge in each first diagonal summed pair is associated with the first color;

changing a direction of summing to a different second diagonal direction;

summing charge in a second portion of the pixels in the pixel array that are positioned in adjacent rows or columns along the second diagonal direction to produce two or more second diagonal summed pairs, wherein the charge in each pixel is associated with a second color and the charge in each second diagonal summed pair is associated with the second color;

summing charge in a third portion of the pixels in the pixel array along one or more non-diagonal directions to produce two or more first summed pairs, wherein the charge in each pixel is associated with a third color and the charge in each summed pair is associated with the third color; and summing charge in a fourth portion of the pixels in the pixel array along one or more non-diagonal directions to produce two or more second summed pairs, wherein the charge in each pixel is associated with a fourth color and the charge in each summed pair is associated with the fourth color;

summing at least two first diagonal summed pairs associated with the first color together;

summing at least two second diagonal summed pairs associated with the second color together;

summing at least two first summed pairs associated with the third color together; and summing at least two second summed pairs associated with the fourth color together.

17. The method as in claim 16, further comprising:
prior to summing the at least two first diagonal summed pairs together, reading the at least two first diagonal summed pairs out of the pixel array;
prior to summing the at least two second diagonal summed pairs together, reading the at least two second diagonal summed pairs out of the pixel array;
prior to summing the at least two first summed pairs together, reading the at least two first summed pairs out of the pixel array; and
prior to summing the at least two second summed pairs together, reading the at least two second summed pairs out of the pixel array.

18. The method as in claim 16, wherein summing charge in pixels in the pixel array along one or more non-diagonal directions comprises summing charge in two pixels along a vertical direction.

19. The method as in claim 17, wherein the at least two first diagonal summed pairs are summed together in a digital domain, the at least two second diagonal summed pairs are summed together in the digital domain, the at least two first summed pairs are summed together in the digital domain, and the at least two second summed pairs are summed together in the digital domain.

20. The method as in claim 16, wherein the at least two first diagonal summed pairs are summed together in a voltage domain, the at least two second diagonal summed pairs are summed together in the voltage domain, the at least two first summed pairs are summed together in the voltage domain, and the at least two second summed pairs are summed together in the voltage domain.

21. The method as in claim 19, wherein the first color and the second color comprise a same color.

* * * * *